United States Patent
Sekiyama et al.

(10) Patent No.: US 6,236,124 B1
(45) Date of Patent: May 22, 2001

(54) LINEAR MOTOR

(75) Inventors: Tokuzou Sekiyama; Satoru Matsubara; Satoshi Nishida; Hiroshi Shibuya, all of Gunma-ken (JP)

(73) Assignee: Nisso Electric Corporation, Gunma-ken (JP)

(*) Notice: Subject to any disclaimer, the term of this patent is extended or adjusted under 35 U.S.C. 154(b) by 0 days.

(21) Appl. No.: 09/362,269

(22) Filed: Jul. 28, 1999

Related U.S. Application Data

(63) Continuation-in-part of application No. 09/300,512, filed on Apr. 28, 1999.

(30) Foreign Application Priority Data

May 1, 1998 (JP) .................................................. 10-122230

(51) Int. Cl.[7] ........................... H02K 41/00; H02K 33/00
(52) U.S. Cl. ................................. 310/12; 310/13; 310/27
(58) Field of Search ................................. 310/12, 13, 15, 310/27, 14, 23, 36, 30

(56) References Cited

U.S. PATENT DOCUMENTS

| | | | |
|---|---|---|---|
| 3,189,768 | * 6/1965 | Brill | 310/13 |
| 3,947,155 | * 3/1976 | Bidol | 417/417 |
| 4,152,570 | * 5/1979 | Inoue et al. | 219/69 V |
| 6,051,896 | * 4/2000 | Shibuya et al. | 310/12 |
| 6,124,648 | * 9/2000 | Shibuya et al. | 310/12 |

* cited by examiner

Primary Examiner—Nestor Ramirez
Assistant Examiner—Dang Dinh Le
(74) Attorney, Agent, or Firm—Morrison & Foerster

(57) ABSTRACT

Linear motor includes a moving member tapered relative to a traveling direction to provide a surface slanted relative to the traveling direction toward one end of the moving member, a stator having a surface that is opposed to the slanted surface of the first member and slanted relative to the traveling direction at an angle corresponding to the slanted angle of the slanted surface of the moving member, a field pole producing section for producing field poles on the slanted surface of the moving member, and an armature section provided on the stator and including armature windings so as to produce electromagnetic poles corresponding to electric currents passed through the armature windings. Thus, the moving member is caused to move relative to the stator, by exciting the armature windings to produce a linearly moving magnetic field. Due to the tapered configuration, magnetic attraction produced between the moving member and the armature core is partly split in the traveling direction, which leads to an increased thrust.

9 Claims, 15 Drawing Sheets

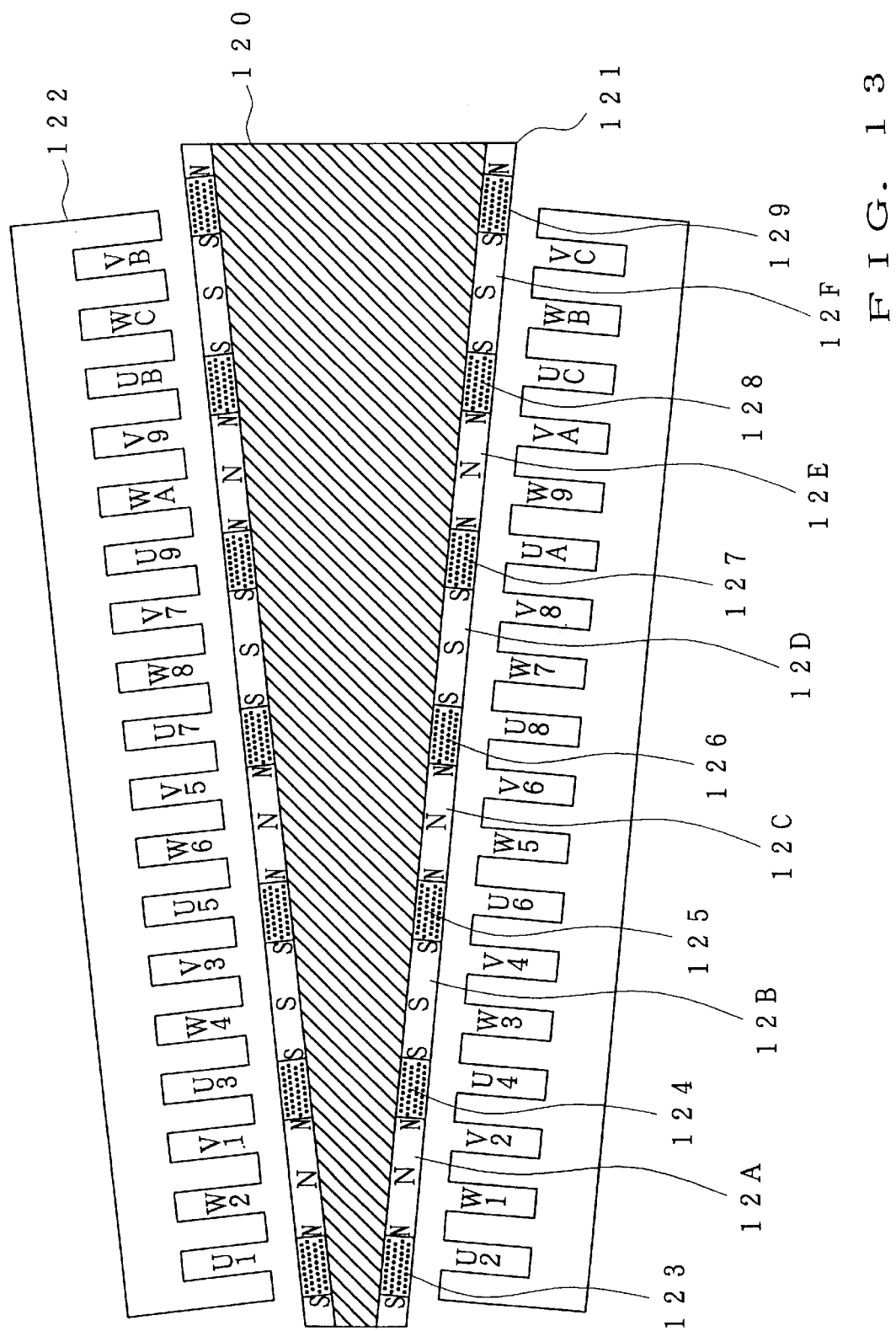

LINEAR MOTOR

RELATED APPLICATION

This application is a continuation-in-part application of our corresponding U.S. application Ser. No. 09/300,512 filed Apr. 28, 1999, which is now pending.

BACKGROUND OF THE INVENTION

The present invention relates to an improved linear motor which is capable of producing a larger thrust in a particular section than thrust produced during normal linear travel.

The linear motors are, in effect, a linearly-unrolled version of the rotary motors. Among currently-known examples of the linear motors are a linear d.c. motor (monopolar or multipolar), linear synchronous motor, linear induction motor and linear pulse motor. Thrust of the linear motors, corresponding to torque of the rotary motors, generally depends on the structure of the motors.

Of various machines etc. to which the linear motors are applied, some require a sufficiently great thrust and others do not require such a great thrust. Further, some of the former may require a great thrust only for a selected or particular working section, and they have so far employed, over an entire working range, a linear motor capable of producing the required thrust. In cases where the required thrust can not be given via the linear motor alone, an additional drive means has been used, in conjunction with or in place of the linear motor, to produce the great thrust for that particular working section.

SUMMARY OF THE INVENTION

It is therefore an object of the present invention to provide a linear motor which is capable of producing a larger thrust in a particular section than thrust produced during normal linear travel.

It is another object of the present invention to provide a linear motor which is capable of easily producing a particular degree of thrust that can not be produced by conventional linear motors.

According to an aspect of the present invention, there is provided a linear motor which comprises: a first member tapered relative to a traveling direction thereof to provide a surface slanted relative to the traveling direction toward one end of the first member; a second member having a surface that is opposed to the slanted surface of the first member and slanted relative to the traveling direction at an angle corresponding to a slanted angle of the slanted surface of the first member; a field pole producing section that produces field poles on the slanted surface of one of the first member and second member; and an armature section provided on another of the first member and second member and including armature windings so as to produce electromagnetic poles corresponding to electric currents passed through the armature windings. Thus, the one of the first member and second member moves relative to the other of the first member and second member in response to excitation of the armature windings.

Generally, conventional-type linear motors comprise an armature section having electromagnetic poles movable in a predetermined traveling direction, and a mover or moving member provided in such a manner that its field poles face the electromagnetic poles of the armature section with a slight gap therebetween. The slight gap is always constant in width along the traveling direction irrespective of a position of the moving member; that is, the gap was a uniform-width gap along the full length thereof. According to the present invention, however, the first member (for example, a moving member) has a contour tapered relative to the traveling direction to thereby provide a surface slanted toward one of its ends in the traveling direction, and the second member (for example, a stator equipped with an armature) has a surface that is opposed to the slanted surface of the first member and also slanted relative to the traveling direction at an angle corresponding to the slanted angle of the slanted surface of the first member; thus, the opposed surface of the first and second members form a gap tapered relative to the traveling direction). Further, in the conventional-type linear motors, magnetic attraction forces are produced between the moving member and the armature core in the normal direction, thus resulting in substantial cancellation between the attraction forces. However, in the present invention, by the opposed surface of the moving member and armature core (first and second members) being arranged to form the gap tapered relative to the traveling direction, the magnetic attraction produced between the moving member and armature core (first and second members) is partly split in the traveling direction, which contributes to a greater thrust than the thrust produced by the conventional-type linear motors. Although, in the linear motor of the invention, the slight gap between the opposed surfaces of the first and second members varies in its width as the two members move relative to each other, the gap width variation can be at a very slow or mild rate because of the gradually tapered gap between the opposed slanted surfaces of the two members.

In a preferred implementation of the present invention, the first member includes magnetic and non-magnetic substance segments provided on the slanted surface thereof alternately along the traveling direction, and the armature section is provided on the second member. Further, the field pole producing section includes a magnetic field core and field windings provided independently of the first member, and the magnetic field core is fixed relative to the second member and has a surface that is opposed to the slanted surface of the first member and also slanted relative to the traveling direction at an angle corresponding to the slanted angle of the slanted surface of the first member, so that field poles corresponding to magnetic poles produced on the magnetic field core are produced on the magnetic substance segments of the first member in response to excitation of the field windings. In this instance, the magnetic substance segments are magnetically separated from each other by the non-magnetic substance segments. The magnetic field and armature cores are magnetically coupled with each other through the magnetic substance segments. Thus, N and S field poles produced on the magnetic field core are coupled with each other via the magnetic substance segments of the first (or moving) member and the armature core, thereby forming closed magnetic circuitry. Because the magnetic field and armature cores and first (or moving) member are magnetically coupled with each other via the slanted surfaces, the magnetic attraction produced between them is partly split in the traveling direction, which acts on the moving member as a axial thrust. If the field pole producing section is fixed relative to the armature section provided on the second member and the first member is a mover, then these elements will be fixed to the stator. In this case, the armature section produces a first linearly moving magnetic field and the field pole producing section produces a second linearly moving magnetic field synchronizing with the first linearly moving magnetic field in a predetermined phase relationship; this arrangement provides a synchronous-type linear motor.

In another preferred implementation of the present invention, the field pole producing section includes field windings provided on the first member and produces field poles on the slanted surface of the first member by excitation of the field windings. In this case, the magnetic field produced by the field windings need not be a moving magnetic field, because the first member and field windings are provided as an integral unit.

In still another preferred implementation of the present invention, the field pole producing section includes permanent magnets provided on the first member and produces field poles on the slanted surface of the first member by means of the permanent magnets.

In a still further preferred implementation of the present invention, the first member (e.g., moving member) is in the shape of a truncated right quadrangular pyramid having the surface slanted toward one end of the first member in the traveling direction. Each side surface of the truncated right quadrangular pyramid provides such a slanted surface. Note that the base of the truncated right quadrangular pyramid may of course be of any desired polygonal shape. Endlessly increasing the number of the base sides of the polygon will give a truncated right circular cone.

Thus, in yet another preferred implementation of the present invention, the first member (e.g., moving member) is in the shape of a truncated right circular cone having the surface slanted toward one end of the first member in the traveling direction. In this case, the slanted surface of the second member (e.g., electromagnetic-pole-side surface of an armature core on the armature section), opposed to the slanted surface of the first member, has an concave curved shape surrounding the peripheral surface of the circular cone.

The travel of the linear motor in accordance with the present invention tends to be limited to a relatively short range in the traveling direction, due to the tapered configuration; however, because the thrust produced by the linear motor is far greater than that produced by the conventional linear motors, the present invention is suitable for use in such applications where the necessary traveling range is relatively short but a great thrust is required.

According to another aspect of the present invention, there is provided a linear motor including a plurality of linear motor structures connected together, at least one of the plurality of linear motor structures being an improved linear motor structure, the improved linear motor structure comprising: a first member tapered relative to a traveling direction thereof to provide a surface slanted relative to the traveling direction toward one end of the first member; a second member having a surface that is opposed to the slanted surface of the first member and slanted relative to the traveling direction at an angle corresponding to a slanted angle of the slanted surface of the first member; a field pole producing section that produces field poles on the slanted surface of one of the first member and second member; and an armature section provided another of the first member and second member and including armature windings, the armature section producing electromagnetic poles corresponding to electric currents passed through the armature windings. The one of the first member and second member moves relative to the other of the first member and second member in response to excitation of the armature windings.

For instance, this linear motor may comprises a plurality of the improved linear motor structures connected together in a multi-stage fashion either in the axial direction or in a direction normal to the axial direction. The combination of these improved linear motor structures can effectively increase the axial thrust.

As another example, at least another of the linear motor structures may be a conventional linear motor structure where the opposed surfaces of the first member and second member are not slanted relative to the traveling direction. Although the travel of the improved linear motor structure is limited to only a relatively short range in the traveling direction due to the tapered configuration; however, the thrust produced by the linear motor is far greater than that produced by the conventional linear motor structure, as previously noted. Thus, by combining the improved linear motor structure and the conventional linear motor structure as proposed in the present invention, efficient control can be performed such that a linear travel drive is given by the improved linear motor structure for a particular section of the traveling range where a great thrust is required and by the conventional linear motor structure for another section of the traveling range where the linear travel can not be effected by the improved linear motor structure. This arrangement implements a linear motor having the advantages of both the improved and conventional linear motors. As a consequence, the present invention can produce a larger thrust in a particular section than thrust produced during normal linear travel.

BRIEF DESCRIPTION OF THE DRAWINGS

For better understanding of the object and other features of the present invention, its preferred embodiments will be described in greater detail hereinbelow with reference to the accompanying drawings, in which:

FIG. 13 is a diagram of a linear motor according to a fifth embodiment of the invention as viewed in the Y-axis direction, showing a sectional structure of the linear motor in the X- and Z-axis planes;

DETAILED DESCRIPTION OF THE PREFERRED EMBODIMENTS

Figure 1:
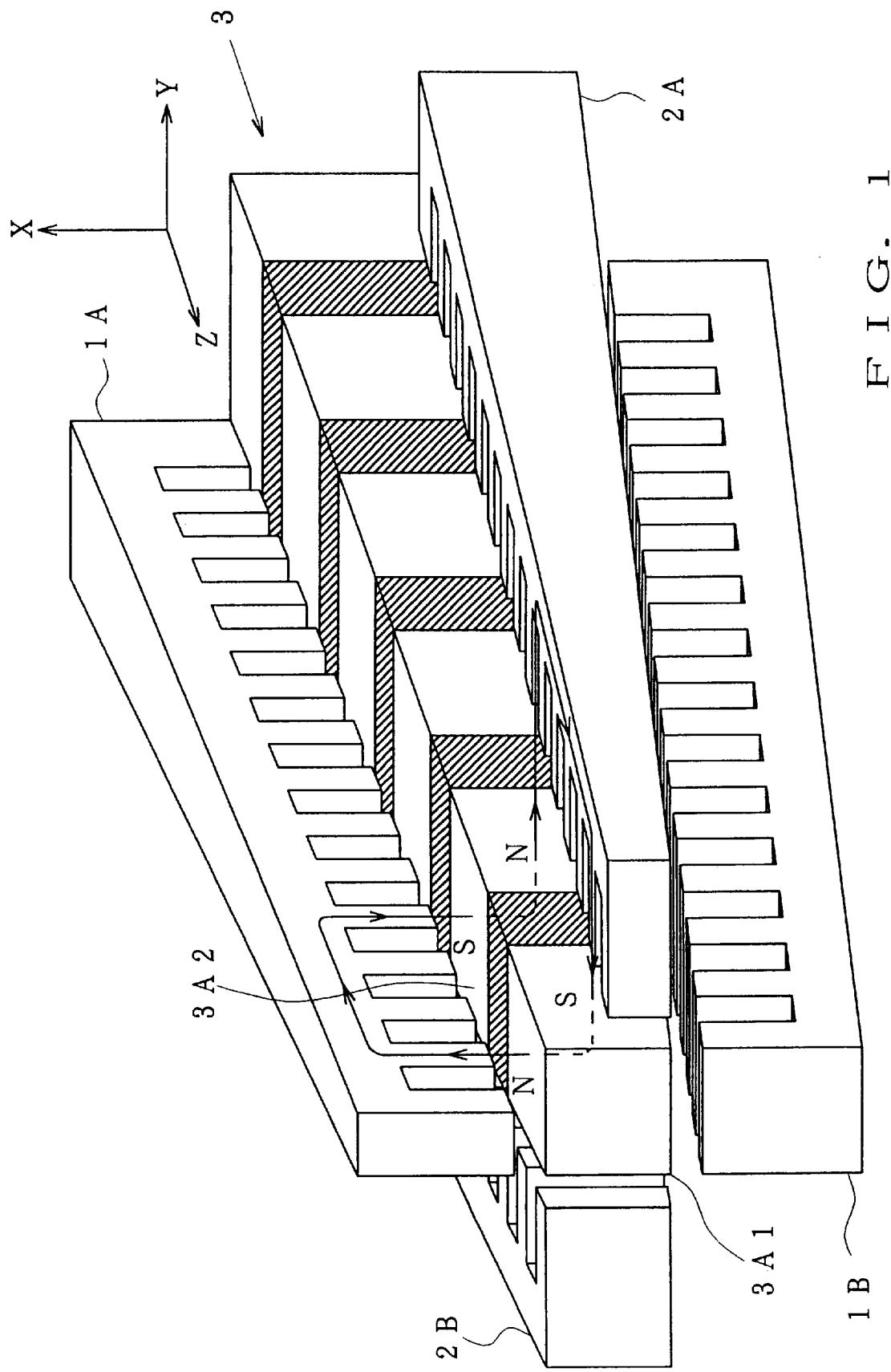
FIG. 1 is a perspective view, partly in section, of a linear motor in accordance with a first embodiment of the present invention.
Figure 2:
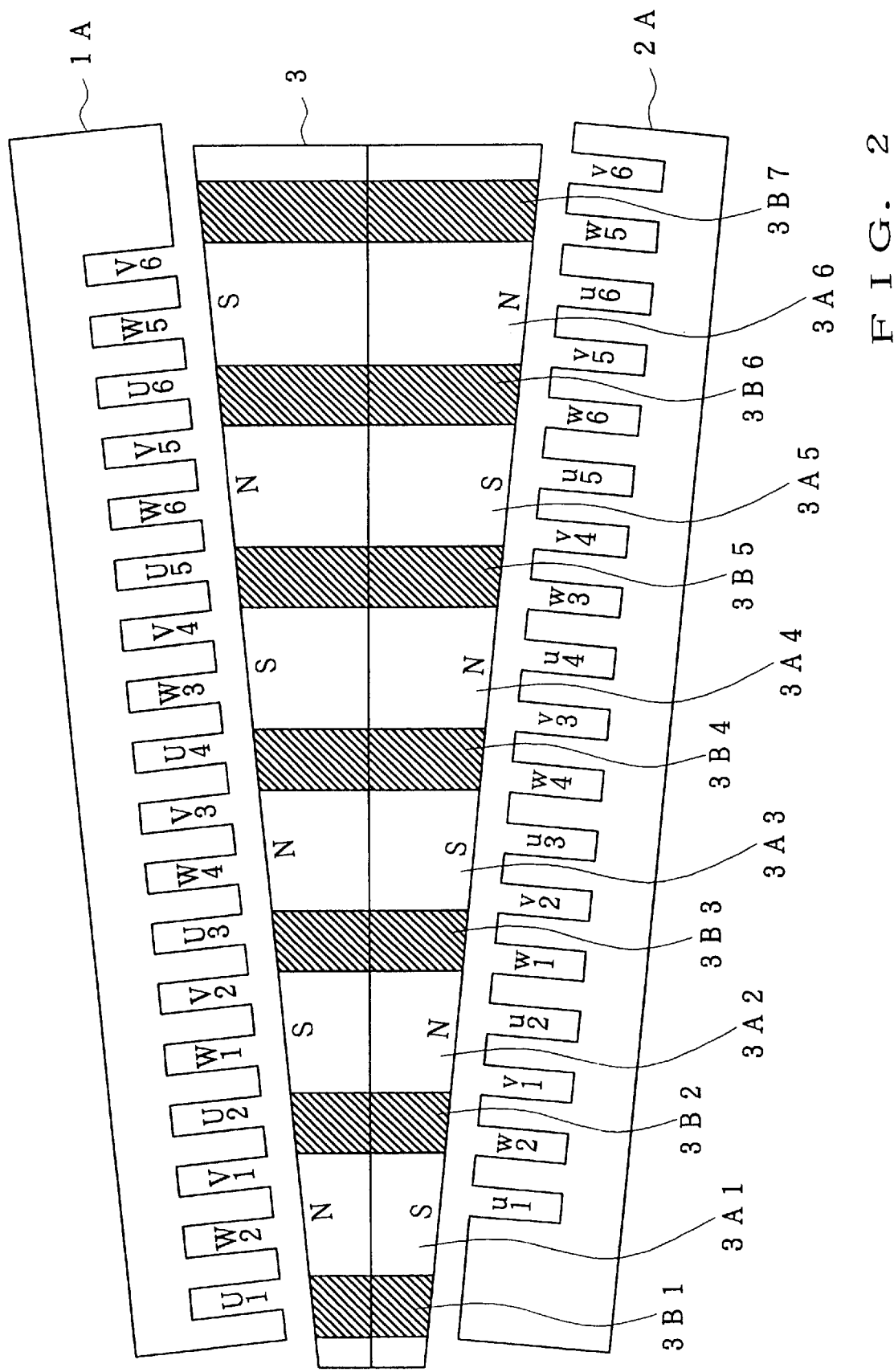
FIG. 2 is a schematic view showing individual components along a longitudinal axis of the linear motor of FIG. 1.

FIG. 1 is a perspective view, partly in section, of a linear motor in accordance with a first embodiment of the present invention, and FIG. 2 is a schematic view showing individual components along the longitudinal axis of the linear motor of FIG. 1. The linear motor is of a type driven by three-phase alternating currents as will be described in detail below, and this linear motor includes a pair of armature cores 1A and 1B secured to a stator frame (not shown), a pair of magnetic field cores 2A and 2B, and a mover or moving member 3 having an alternating sequence of magnetic substance segments and non-magnetic substance segments 3A1–3A6 and 3B1–3B6. The moving member 3 is freely movable in an X-axis direction via a slider (also not shown), is tapered in a Z-axis or traveling direction, i.e., generally in the form of a truncated quadrangular pyramid with four side surfaces having tapered or trapezoidal shapes, and magnetically coupled with the armature cores 1A and 1B and magnetic field cores 2A and 2B. Thus, the side surfaces of the moving member 3 are slanted relative to the Z-axis or traveling direction toward one end of the member 3. The linear motor of FIG. 1 is capable of producing a very great thrust in the X-axis direction, by means of magnetic attraction occurring between the truncated quadrangular pyramid portion of the moving member 3 provided with the magnetic and non-magnetic substance segments 3A1–3A6 and 3B1–3B6 and the armature cores 1A and 1B and magnetic field cores 2A and 2B.

The above-mentioned armature cores 1A and 1B are secured to the stator frame (not shown) in such a manner that their magnetic-pole-side surfaces face opposite surfaces (upper and lower surfaces in FIG. 1) of the moving member 3 and are slanted, relative to the Z-axis or traveling direction, at an angle corresponding to the slanted angle of the moving member 3 so as to form a uniform-width gap in conjunction with the corresponding surface of the moving member 3 along the full length thereof. Importantly, the gap is slanted relative to the Z-axis or traveling direction. Each of the armature cores 1A and 1B is a laminated iron core that is constructed of a plurality of thin comb-shaped silicon steel plates stacked in a Y-axis direction. Specifically, each of the armature cores 1A and 1B has a total of 18 slots (only 14 slots are shown for convenience of illustration) along the direction of travel (i.e., along the Z-axis direction), and each of the slots extends perpendicularly to the corresponding surface of the moving member 3. The number of the slots may be determined depending on the specifications of the linear motor, rather than being limited only to 18.

On each of the armature cores 1A and 1B, there are provided three-phase armature windings (i.e., U-phase, V-phase and W-phase windings), which are received in selected ones of the slots in such a way that the U-phase, V-phase and W-phase armature windings are positioned to be shifted from each other by 120 electrical degrees. In this specification and drawings, these armature windings are denoted by upper-case English letters while the field windings are denoted by lower-case English letters. More specifically, the first U-phase armature winding is wound from slot U1 to slot U2, the second U-phase armature winding is wound from slot U3 to slot U4, and the third U-phase armature winding is wound from slot U5 to slot U6. Similarly, the first V-phase armature winding is wound from slot V1 to slot V2, the second V-phase armature winding is wound from slot V3 to slot V4, and the third V-phase armature winding is wound from slot V5 to slot V6. Further, the first W-phase armature winding is wound from slot W1 to slot W2, the second W-phase armature winding is wound from slot W3 to slot W4, and the third W-phase armature winding is wound from slot W5 to slot W6.

Similarly to the above-described armature cores 1A and 1B, the magnetic field cores 2A and 2B are secured to the stator frame (not shown) in such a manner that they face opposite surfaces (left and right surfaces in FIG. 1) of the truncated quadrangular pyramid body of the moving member 3 and each of them forms a uniform gap with the corresponding surface of the moving member 3 along the full length thereof. Importantly, the gap is slanted relative to the Z-axis or traveling direction. Each of the magnetic field cores 2A and 2B is a laminated iron core that is constructed of a plurality of thin comb-shaped silicon steel plates stacked in the Z-axis or traveling direction. Specifically, each of the magnetic field cores 2A and 2B has a total of 18 slots (only 14 slots are shown for convenience of illustration) along the direction of travel (i.e., along the Z-axis direction). The number of the slots in the magnetic field cores 2A and 2B may also be determined depending on the specifications of the linear motor, rather than being limited only to 18.

On each of the magnetic field cores 2A and 2B, there are provided three-phase field windings (i.e., u-phase, v-phase and w-phase windings), which are received in selected ones of the slots in such a way that the u-phase, v-phase and w-phase field windings are positioned to be shifted from each other by 90 electrical degrees; that is, these u-phase, v-phase and w-phase field windings are shifted from the corresponding armature windings by 90 electrical degrees, i.e., bone and a half slots, in the Z-axis direction. More specifically, the first u-phase field winding is wound from slot u1 to slot u2, the second u-phase field winding is wound from slot u3 to slot u4, and the third u-phase field winding is wound from slot u5 to slot u6. Similarly, the first v-phase field winding is wound from slot v1 to slot v2, the second v-phase field winding is wound from slot v3 to slot v4, and the third v-phase field winding is wound from slot v5 to slot v6. Further, the first w-phase field winding is wound from slot w1 to slot w2, the second w-phase field winding is wound from slot w3 to slot w4, and the third w-phase field winding is wound from slot w5 to slot w6. The phase shift amount need not be exactly 90 electrical degrees and may be just in the neighborhood of 90 electrical degrees depending on the configuration of the linear motor.

The moving member 3 includes the magnetic substance segments 3A1 to 3A6 and non-magnetic substance segments 3B1 to 3B7 provided along the traveling direction or Z-axis direction. The non-magnetic substance segment 3B1 to 3B7 act to magnetically separate the magnetic substance segments 3A1 to 3A6 from each other, to ensure that the magnetic substance segments 3A1 to 3A6 are not magnetically coupled with each other in the traveling direction. By the magnetic substance segments 3A1 to 3A6 being thus magnetically separated from each other by the non-magnetic substance segments 3B1 to 3B7, the magnetic flux produced from the N poles of the magnetic field cores 2A and 2B enters the magnetic substance segments 3A1, 3A3 and 3A6 via their S poles and then leaves the magnetic substance segments 3A1, 3A3 and 3A6 via their N poles to enter the S poles of the armature cores 1A and 1B. On the other hand, the magnetic flux produced from the N poles of the armature cores 1A and 1B enters the magnetic substance segments 3A2, 3A4 and 3A5 via their S poles and then leaves the magnetic substance segments 3A2, 3A4 and 3A5 via their N poles to enter the S poles of the magnetic field cores 2A and 2B. Thus, in this linear motor, predetermined closed magnetic circuitry is formed by the armature cores 1A and 1B and magnetic field cores 2A and 2B by means of the moving member 3.

The following three-phase alternating currents iu, iv and iw, phase-shifted from each other by 120 electrical degrees, are passed through the three-phase field windings located on the magnetic field cores 2A and 2B:

iu=im·sin ωt iv=im·sin(ωt−2π/3)

iw=im·sin(ωt−4π/3)

where "im" represents a maximum electric current value.

By such currents iu, iv and iw passed through the three-phase field windings on the magnetic field core 2A, field poles producing magnetic flux directed to the magnetic substance segments 3A1, 3A3 and 3A5 of the moving member 3 (i.e., N poles) and field poles absorbing magnetic flux directed from the magnetic substance segments 3A2, 3A4, 3A6 and 3A8 to the magnetic field core 2A (i.e., S poles), as shown in FIG. 1, are both caused to occur on the surface of the magnetic field core 2A opposed to the moving member 3 and move in the traveling or Z-axis direction. Similar three-phase alternating currents iu, iv and iw are passed through the three-phase field windings located on the other magnetic field core 2B, so that field poles (N and S poles) are both caused to occur on the surfaces of the magnetic field core 2B opposed to the moving member 3 and move in the traveling or Z-axis direction in a similar to the magnetic field core 2A.

Magnetic fields produced in and around the field poles (N and S poles) of the moving member 3 via the three-phase currents assume a sinusoidal magnetic flux distribution in the traveling direction, and the magnetic flux can be expressed as follows if the maximum magnetic flux is represented by φ and the pole center is represented by θ=0:

φ=φm·cos θ

If the currents passed through the three-phase field windings are controlled in such a manner that the field pole centers of the magnetic fields produced on the moving member 3 by the three-phase field currents coincides with an "easiest-to-magnetize" surface portion of the linear moving member 3, i.e., the field pole centers are located at or around center portions of the magnetic substance segments 3A1 to 3A6 of the moving member 3, these magnetic substance segments 3A1 to 3A6 will be magnetized in a predetermined direction and assume a magnetic flux density that can be approximately expressed by B=Bm·cosθ

Namely, the magnetic substance segments 3A1 to 3A6 of the moving member 3 are magnetized in predetermined directions in response to the field poles (N and S poles) produced on the magnetic field cores 2A and 2B. For example, by the currents iu, iv, iw, N poles are produced on the surfaces of the magnetic field cores 2A and 2B facing the magnetic substance segments 3A1, 3A3 and 3A5 and S poles are produced on the surfaces of the field cores 2A and 2B facing the magnetic substance segments 3A2, 3A4 and 3A6, in response to which S poles are produced on the surfaces of the magnetic substance segments 3A1, 3A3 and 3A5 facing the magnetic field cores 2A and 2B and on the surfaces of the magnetic substance segments 3A2, 3A4 and 3A6 facing the armature cores 1A and 1B. Also, N poles are produced on the surfaces of the magnetic substance segments 3A1, 3A3 and 3A5 facing the armature cores 1A and 1B and on the surfaces of the magnetic substance segments 3A2, 3A4 and 3A6 facing the magnetic field cores 2A and 2B.

As typically shown in FIG. 1, the magnetic flux produced from the N pole of the magnetic field core 2A enters the magnetic substance segment 3A1 through its S-pole surface (side surface). The magnetic flux, having thus entered the magnetic substance segment 3A1, then enters the armature core 1A via its N-pole surface (upper surface), passes through the core 1A in the traveling direction, and thence enters the next magnetic substance segment 3A2 via its S-pole surface (upper surface). Although only the relationship between the magnetic field core 2A and the armature core 1A is shown in the figure for simplicity, a similar magnetic flux flow occurs between the magnetic field core 2A and the armature core 1B and also between the magnetic field core 2B and the armature core 1A or 1B. Thus, in this linear motor, predetermined closed magnetic circuitry is formed by the magnetic field cores 2A and 2B, linear moving member 3 and armature cores 1A and 1B.

By passing the three-phase alternating currents (armature currents) IU, IV and IW through the three-phase armature windings of the armature cores 1A and 1B, driving thrust is developed in accordance with the well-known Fleming's rule, which causes the moving member 3 to move in the predetermined direction. Specifically, the following three-phase alternating currents IU, IV and IW, phase-shifted from each other by 120 electrical degrees, are passed through the three-phase windings located on the armature cores 1A and 1B:

IU=Im·sin ωt

IV=Im·sin(ωt−2π/3)

IW=Im·sin(ωt−4π/3)

where Im represents a maximum electric current value.

Because the three-phase armature windings are phase-shifted from the corresponding field windings by 90 electrical degrees in this case, torque T is developed in accordance with the Fleming's rule, which causes the linear moving member 3 to move in the predetermined direction. In this case, only the intensity of the currents passed through the field and armature windings has to be controlled in order to control the intensity of this torque T. Although the armature currents may also produce magnetic flux, the flux has only a negligible influence because magnetization is substantially impeded by the non-magnetic substance segments 3B1 to 3B7 of the moving member 3.

The linear motor according to the instant embodiment is different from the conventional linear motors primarily in that the moving member 3 is in the form of a truncated quadrangular pyramid having trapezoidal or tapered side surfaces slanted relative to the traveling direction and that the armature cores 1A and 1B and magnetic field cores 2A and 2B are provided to form gaps, slanted relative to the traveling direction, with the tapered side surfaces along the full length of the moving member 3. Because of the tapered configuration of the moving member 3, magnetic attraction F is produced on the closed magnetic circuitry between the moving member 3 and the magnetic field cores 2A and 2B and between the moving member 3 and the armature cores 1A and 1B. With this magnetic attraction F, thrust Fz is caused to the moving member 3, which is greater than the torque T produced on the basis of the Fleming's rule. Note that if only the magnetic attraction is to be simply produced on the magnetic circuitry, then it will be only necessary that the moving member 3 and the armature core 1A or magnetic field core 2A are opposed to each other in a direction normal to the traveling direction Z as shown in FIG. 4; however, this simple arrangement will present the problem that a travelable distance of the moving member 3 is too small for practical use and besides the thrust Fz is very difficult to control.

This is why the moving member 3 in the inventive linear motor is in the form of a truncated quadrangular pyramid having trapezoidal or tapered side surfaces slanted relative to the traveling direction and the armature cores 1A and 1B and magnetic field cores 2A and 2B are provided to form gaps, slanted relative to the traveling direction, from the tapered or slanted side surfaces along the full length of the moving member 3. With such an arrangement, there is established a relationship that the traveling distance $\Delta Z$ of the moving member 3 is greater than the width of the gap d between the moving member 3 and the armature core or magnetic field core, so that a sufficient traveling distance $\Delta Z$ of the moving member 3 greater than the gap width d can be guaranteed even with a small gap with d and it is possible to reduce the necessary exciting current and substantially improve the thrust characteristics.

Figure 3:
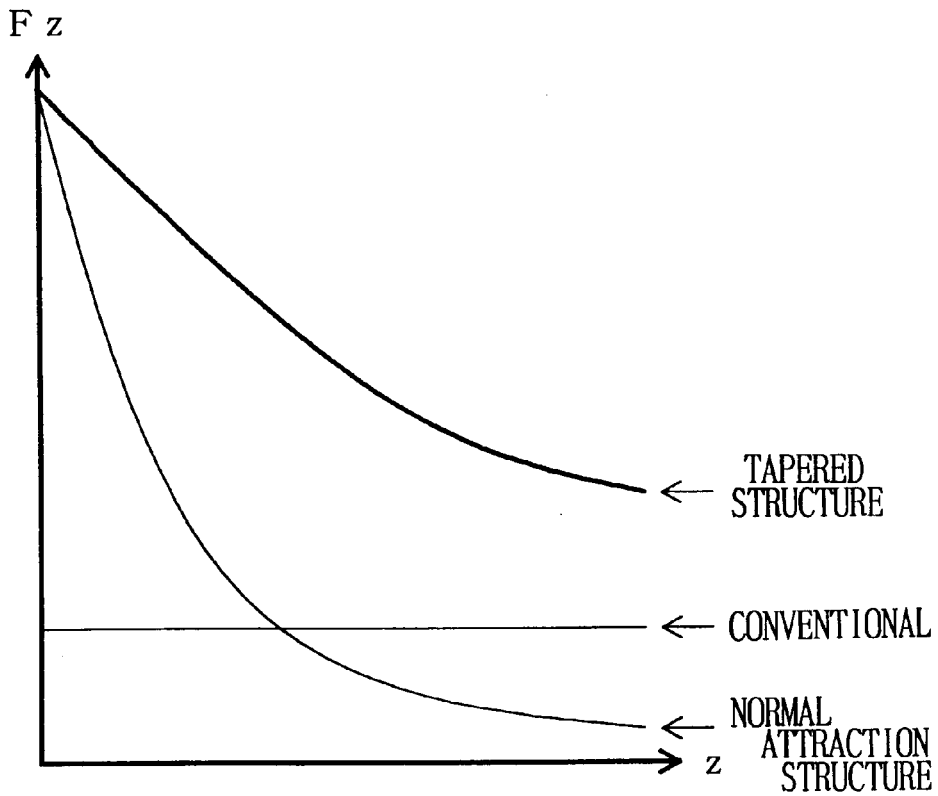
FIG. 3 is a graph showing a traveling distance vs. thrust relationship in three different types of linear motor structures.
Figure 4:
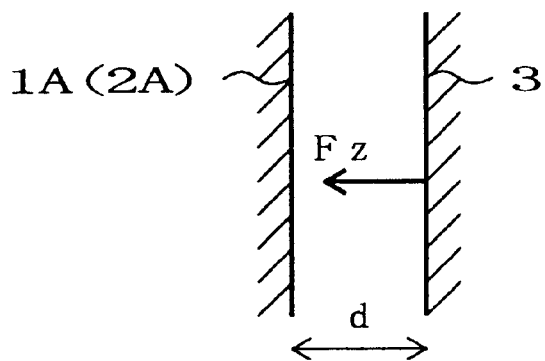
FIG. 4 is a schematic diagram showing how an armature or magnetic field core and a moving member magnetically attract each other in a direction normal to the traveling direction.

FIG. 3 is a graph showing relationship between the traveling distance z and the thrust Fz 1) in the case where the armature core 1A and magnetic field core 2A and the moving member 3 attract each other, by the produced magnetic attraction alone, in a plane normal to the traveling direction Z as shown in FIG. 4 ("normal attraction structure"), 2) in the case where the moving member 3 is in the form of a truncated quadrangular pyramid having trapezoidal or tapered side surfaces slanted relative to the traveling direction as shown in FIG. 1 and the armature core 1A or magnetic field core 2A and the moving member 3 attract each other in the traveling direction Fz by the thrust Fz resulting from the magnetic attraction F between the armature cores 1A, 1B and magnetic field cores 2A, 2B and the tapered side surfaces of the moving member 3 ("tapered structure"), and 3) in the "conventional linear motor structure". As apparent from FIG. 3, in the "normal attraction structure" or fully parallel rotor structure where the armature core 1A and magnetic field core 2A and the moving member 3 simply attract each other by the produced magnetic attraction alone, the thrust Fz decreases sharply as the traveling distance z becomes greater. In the "conventional linear motor structure", the thrust Fz is kept constant irrespective of the traveling distance z. However, in the "tapered structure" with the moving member 3 having surfaces slanted relative to the traveling direction as shown in FIG. 1, the thrust decrease can be less than in the normal attraction structure or fully parallel rotor structure irrespective of an increase in the traveling distance z; that is, the thrust Fz only decreases slowly relative to the traveling distance and the intensity of the thrust Fz can be sufficiently greater than that achieved by the conventional linear motor. This is because the tapered configuration achieves a greater traveling distance $\Delta Z$ of the moving member 3 than the normal attraction structure or fully parallel rotor structure even when the gap width d is the same and because the magnetic attraction produced between the armature and magnetic cores and the moving member, which has not been utilized in the conventional linear motor, is used as the thrust Fz of the moving member 3.

Figure 5:
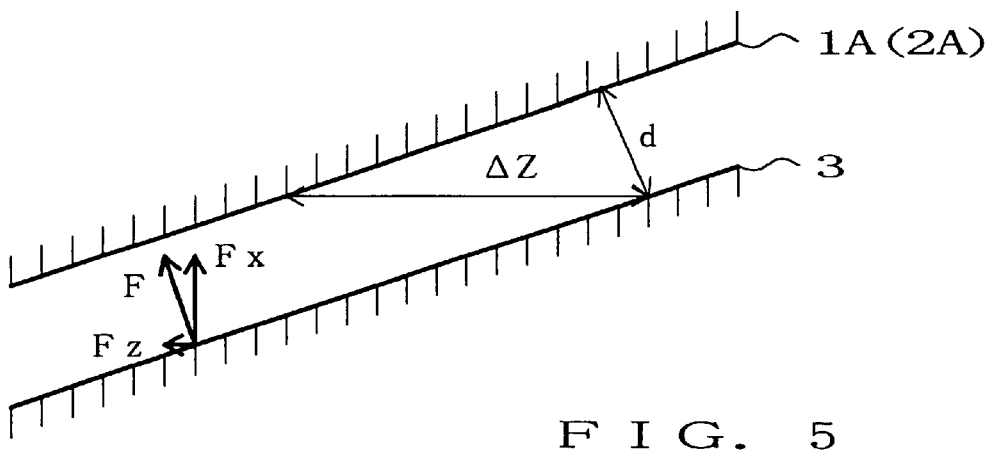
FIG. 5 is a diagram showing a relationship between the magnetic attraction and the traveling distance in a situation where the armature or magnetic field core and the moving member are opposed to each other in slanted relation to the traveling direction.

FIG. 5 is a diagram showing exemplary operational relationship between the moving member and armature and magnetic field cores in the inventive linear motor of FIG. 1. As shown in FIG. 5, magnetic attraction F is produced between the moving member 3 and the armature core 1A or magnetic field core 2A in a direction normal to the slanted side surface of the moving member 3. This magnetic attraction F is split into force in the Z-axis direction (i.e., thrust) Fz and force F+x in the positive X-axis direction. Similarly, magnetic attraction F produced and acting between the moving member 3 and the armature core 1B is split into force in the Z-axis direction (i.e., thrust) Fz and force F−x in the negative X-axis direction. Magnetic attraction F produced and acting between the moving member 3 and the magnetic field core 2A is split into force in the Z-axis direction (i.e., thrust) Fz and force F+y in the positive Y-axis direction. Magnetic attraction F produced and acting between the moving member 3 and the magnetic field core 2B is split into force in the Z-axis direction (i.e., thrust) Fz and force F−y in the negative Y-axis direction. Thus, while the forces F−x and F−x in the X-axis direction cancel each other and similarly, the forces F+y and F−y in the Y-axis direction cancel each other, the forces (thrust) Fz in the Z-axis direction combine with each other in a single direction, developing, in the moving member 3, such thrust that is sufficiently greater than that achieved by the conventional linear motor. It should be obvious that in the case where the moving member 3 is fixed, the armature and magnetic field cores are designed to linearly move, while in the case where the armature and magnetic field cores are fixed, the moving member 3 is designed to move as in the described embodiment.

Figure 6:
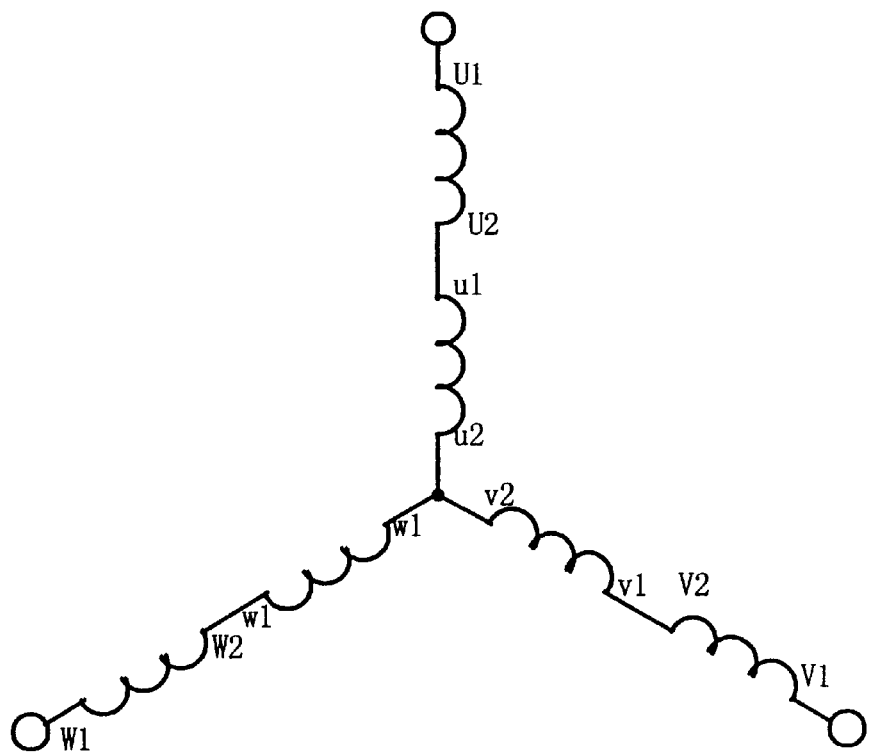
FIG. 6 is a diagram illustrating an exemplary wiring organization between armature and field windings in the linear motor of FIG. 1.

FIG. 6 is a diagram illustrating an exemplary wiring organization between the armature and field windings in the linear motor of FIG. 1. In the case where the armature and field windings are mechanically positioned to be phase-shifted from each other by 90 electrical degrees as shown in FIG. 2, the armature and field windings can be wound in series with each other, and the linear motor can be controlled via a single inverter as an a.c. motor having series winding characteristics. In this case, desired thrust can be produced by adding a thrust-controlling winding to the field windings so as to control the respective exciting currents to the field windings located adjacent to the opposite sides of the moving member 3. In the event that the armature and field windings are mechanically positioned to be in phase with each other in stead of being phase-shifted by 90 electrical degrees, it suffices that the field and armature currents are controlled via different invertors to be phase-shifted from each other by 90 electrical degrees.

Whereas the linear motor of FIG. 1 has been described above in relation to the case where two armature cores and two magnetic field cores are provided around the moving member 3, one core facing each side surface of the moving member 3, the number of the armature and magnetic field cores is not so limited; it is only necessary to provide at least one armature core and at least one magnetic field core. For instance, the linear motor may include one armature core and two magnetic field cores, two armature cores and one magnetic field core, or three or more armature cores and three or more magnetic field cores.

Figure 7:
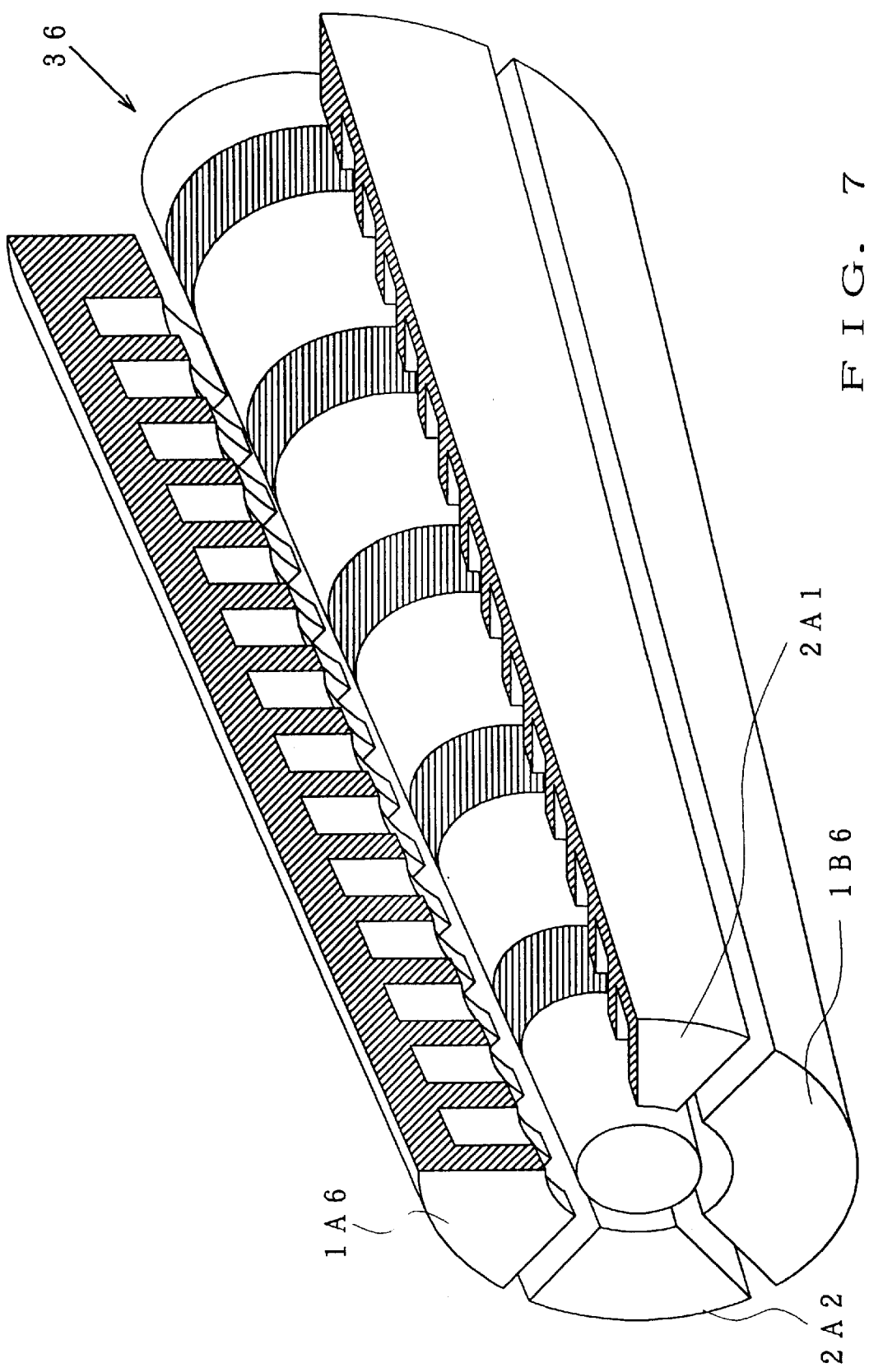
FIG. 7 is a perspective view, partly in section, of a linear motor in accordance with a second embodiment of the present invention.

FIG. 7 is a perspective view, partly in section, of a linear motor in accordance with a second embodiment of the present invention. The linear motor according to the second embodiment is different from the linear motor of FIG. 1 in that the moving member 36 is in the shape of a truncated right circular cone and correspondingly the armature cores 1A6 and 1B6 and magnetic field cores 2A1 and 2A2 together form a cylindrical structure having a conical inner surface along the peripheral surface of the truncated right circular cone body of the moving member 36. The armature cores 1A6 and 1B6 and magnetic field cores 2A1 and 2A2 are similar in detailed construction to those of the embodiment of FIG. 1 and will not be described in detail here to avoid unnecessary duplication. By thus forming the linear motor into a truncated right-circular-cone shape as a whole, the linear motor of FIG. 7 can be reduced in overall volume as compared to the linear motor of FIG. 1. Further, where the moving member 3 is provided as a rotation shaft, the rotation shaft can be caused to move in the thrust direction by only forming its end portion into a tapered cylindrical shape (or truncated right-circular-cone shape).

Figure 8:
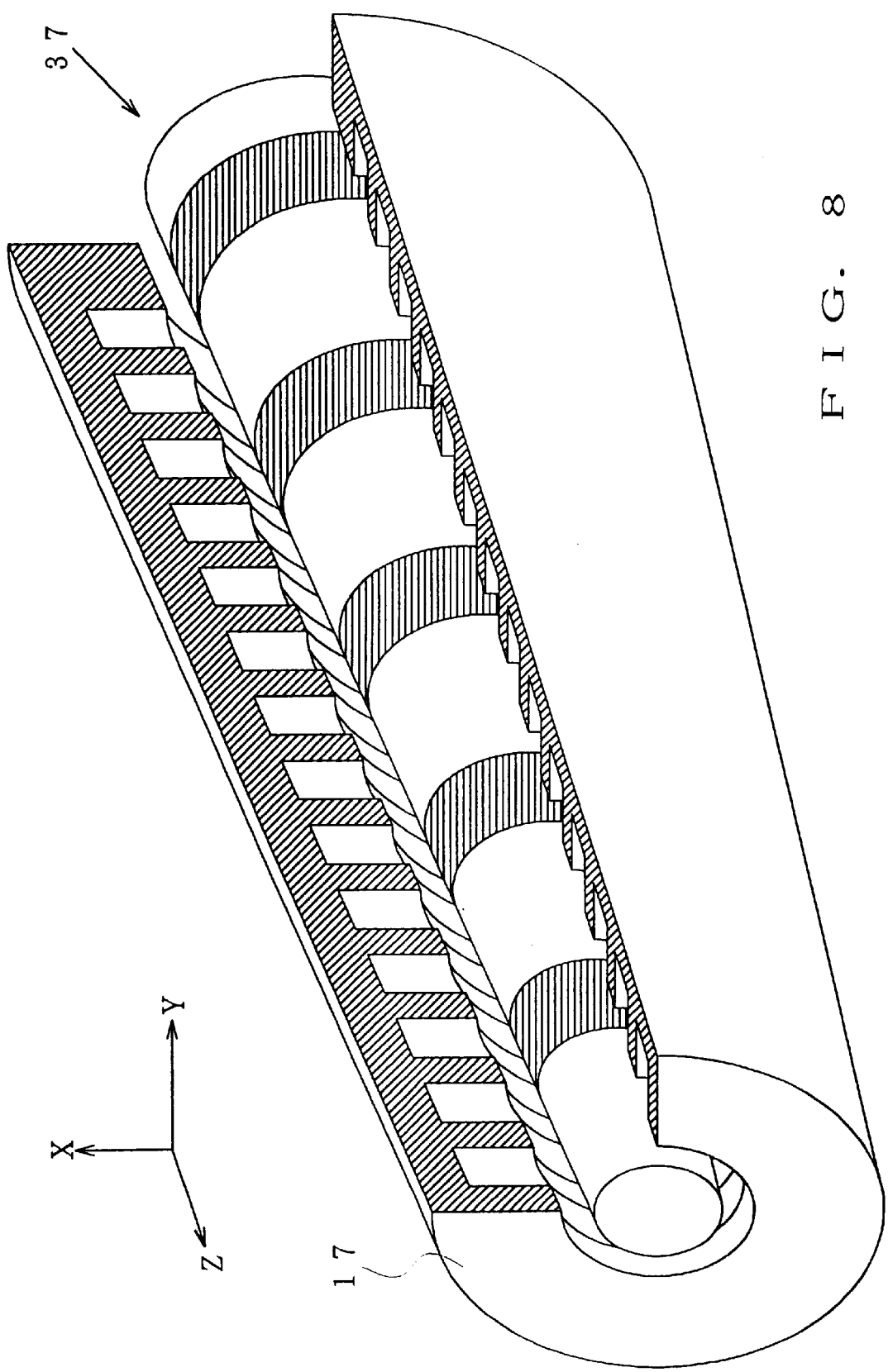
FIG. 8 is a perspective view, partly in section, of a linear motor in accordance with a third embodiment of the present invention.
Figure 9:
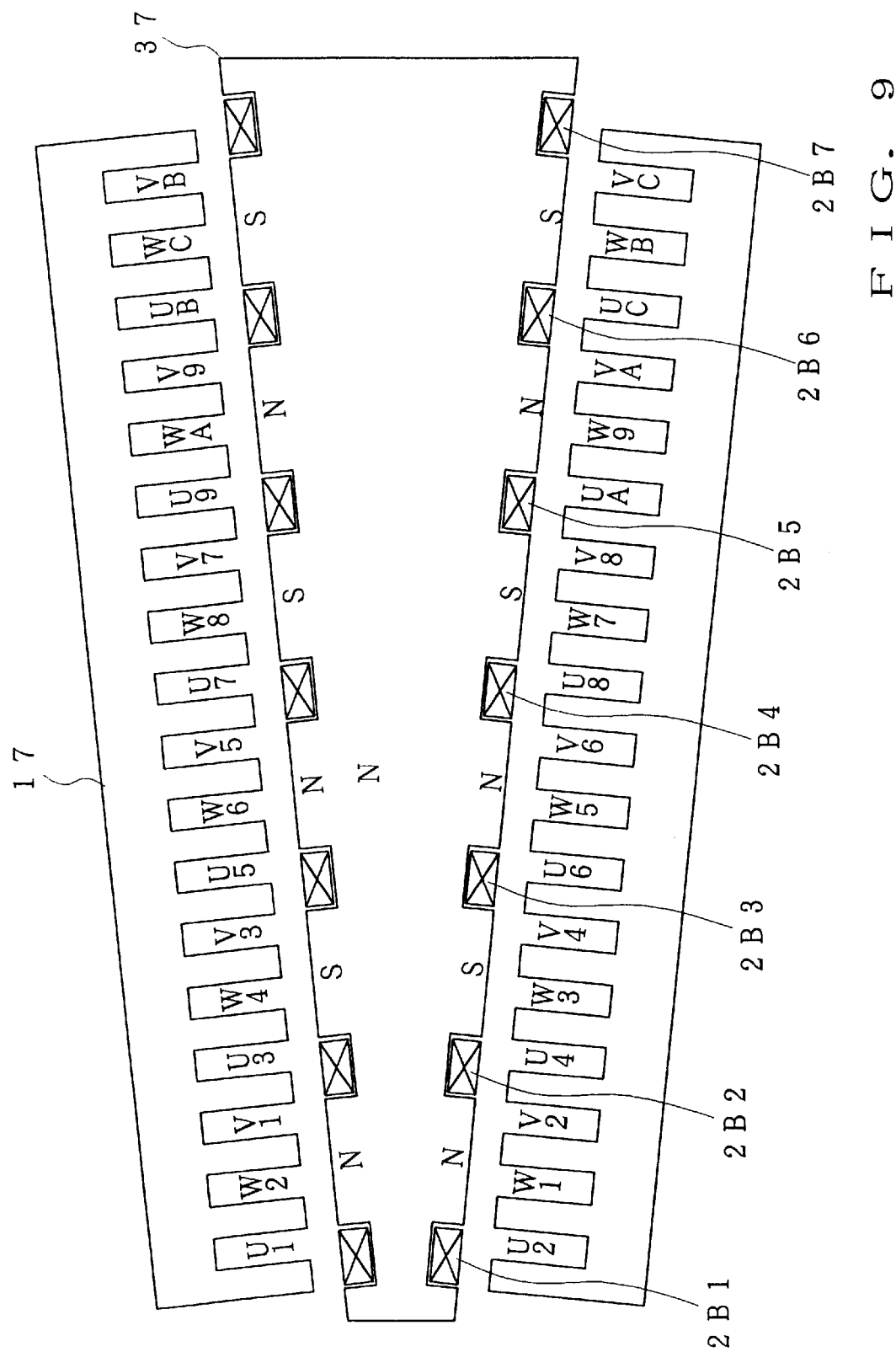
FIG. 9 is a diagram of the linear motor of FIG. 8 as viewed in a Y-axis direction, showing a sectional structure of the linear motor in X- and Z-axis planes.
Figure 10:
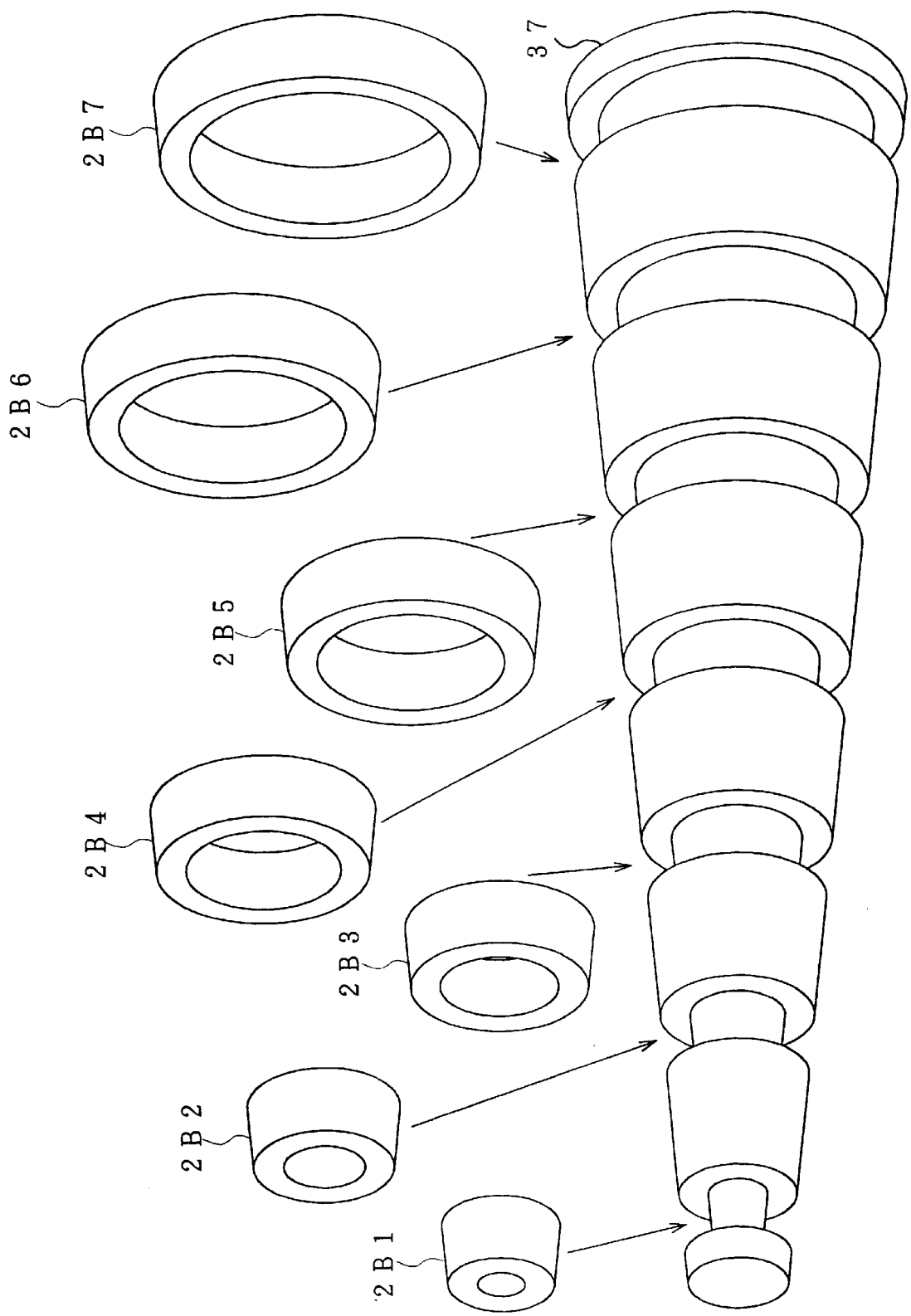
FIG. 10 is a perspective view showing detailed construction of the moving member employed in the linear motor of FIG. 8.

Further, FIG. 8 is a perspective view, partly in section, of a linear motor in accordance with a third embodiment of the present invention, and FIG. 9 is a diagram of the linear motor of FIG. 8 as viewed in the Y-axis direction, showing a sectional structure of the linear motor in the X- and Z-axis planes. Further, FIG. 10 is a perspective view showing detailed construction of the moving member 37 employed in the linear motor of FIG. 8. Specifically, the linear motor according to the third embodiment includes the moving member 37 having a truncated right-circular-cone shape, an armature core 17 having armature windings provided on and along its cylindrical inner surface sounding the periphery of the moving member 37, and field windings 2B1 to 2B7 received in annular slots formed in the moving member 37. The armature windings are conventional three-phase windings, i.e., U-phase, V-phase and W-phase windings. Namely, in the clockwise direction as viewed along the Z-axis, the first U-phase armature winding is wound from slot U1 to slot U2, the second U-phase armature winding is wound from slot U3 to slot U4, the third U-phase armature winding is wound from slot U5 to slot U6, the fourth U-phase armature winding is wound from slot U7 to slot U8, the fifth U-phase armature winding is wound from slot U9 to slot UA, and the sixth U-phase armature winding is wound from slot UB to slot UC. Similarly, in the clockwise direction as viewed along the Z-axis, the first V-phase armature winding is wound from slot V1 to slot V2, the second V-phase armature winding is wound from slot V3 to slot V4, the third V-phase armature winding is wound from slot V5 to slot V6, the fourth V-phase armature winding is wound from slot V7 to slot V8, the fifth V-phase armature winding is wound from slot V9 to slot VA, and the sixth V-phase armature winding is wound from slot VB to slot VC. Further, in the counterclockwise direction as viewed along the Z-axis, the first W-phase armature winding is wound from slot W1 to slot W2, the second W-phase armature winding is wound from slot W3 to slot W4, the third W-phase armature winding is wound from slot W5 to slot W6, the fourth W-phase armature winding is wound from slot W7 to slot W8, the fifth W-phase armature winding is wound from slot W9 to slot WA, and the sixth W-phase armature winding is wound from slot WB to slot WC.

In the individual slots of the moving member 37 having the truncated right-circular-cone shape, there are received ring-shaped field windings 2B1 to 2B7 in such a manner that S and N magnetic poles occur alternately on side surface portions of the moving member 37 between the field windings 2B1 to 2B7. With such an arrangement, thrust Fz is produced based on magnetic attraction F between the armature winding 17 and the moving member 37 exactly as in the case of the linear motor of FIG. 1, so that the moving member 37 is allowed to move with thrust sufficiently greater than that achieved by the conventional linear motor.

Figure 11:
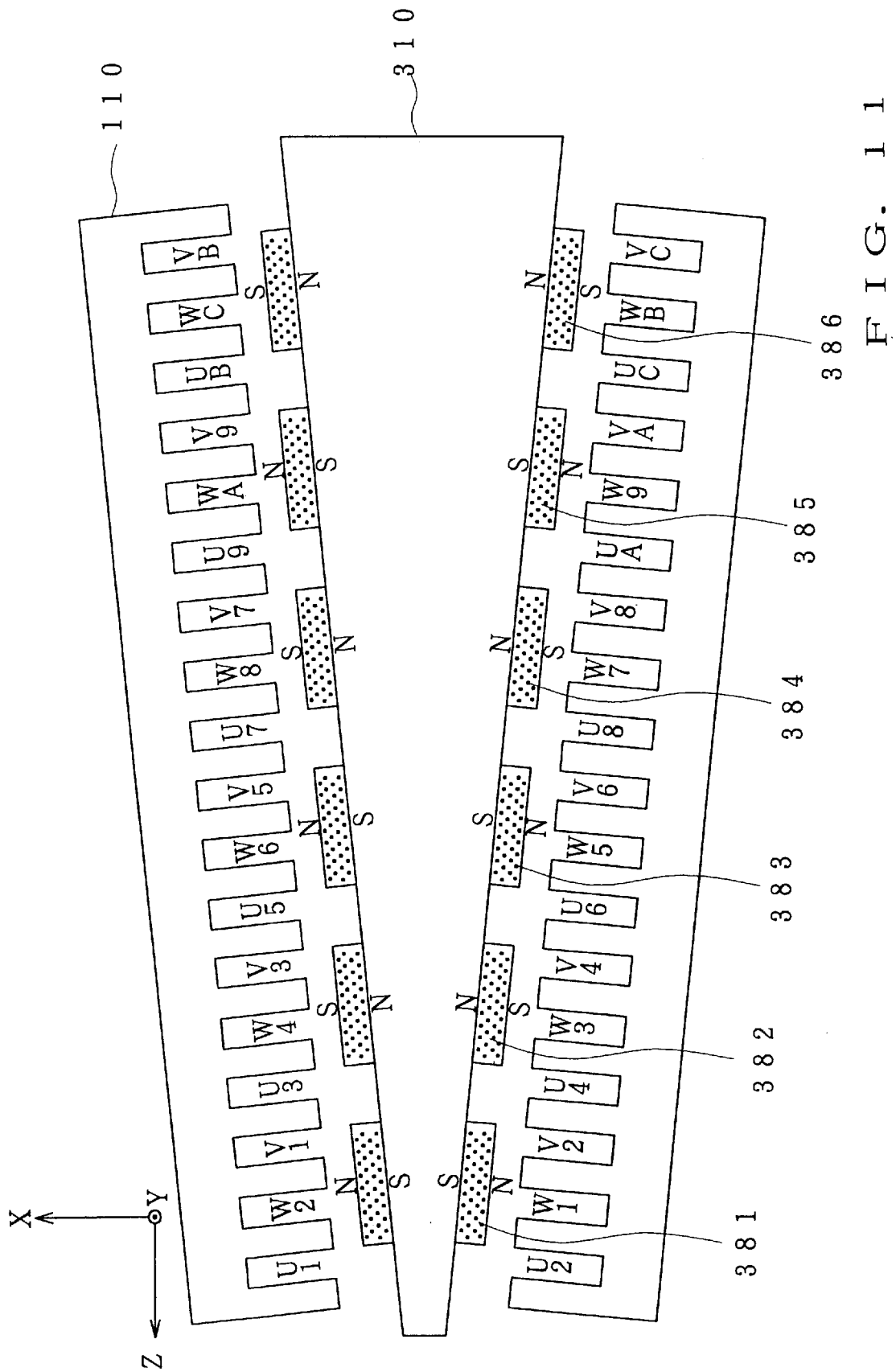
FIG. 11 is a diagram of a linear motor according to a fourth embodiment of the invention as viewed in the Y-axis direction, showing a sectional structure of the linear motor in the X- and Z-axis planes.
Figure 12:
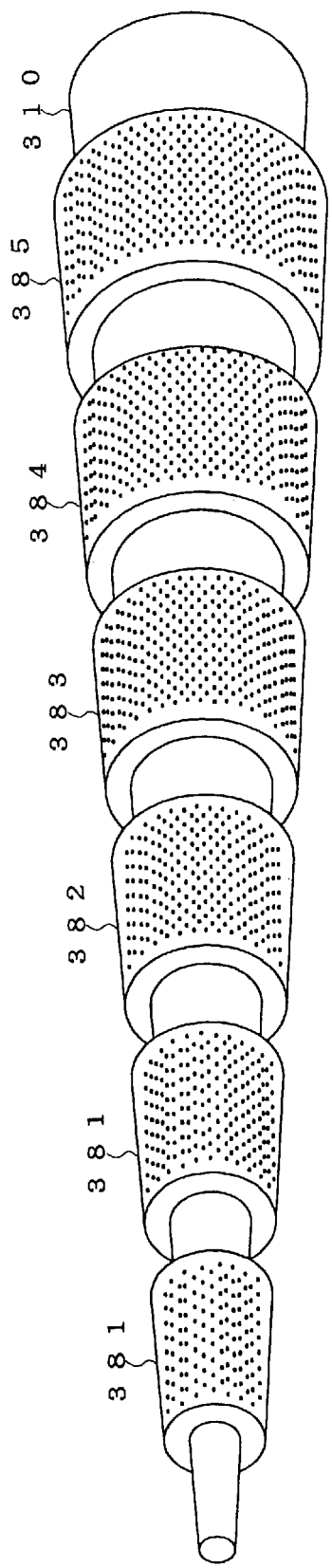
FIG. 12 is a perspective view showing an external appearance of the moving member employed in the linear motor of FIG. 11.

FIG. 11 is a diagram of a linear motor according to a fourth embodiment of the invention as viewed in the Y-axis direction, showing a sectional structure of the linear motor in the X- and Z-axis planes. The linear motor according to the fourth embodiment is generally similar in fundamental structure to the linear motor of FIG. 8 but different from the latter in that individual field poles on the moving member 310 are in the form of ring-shaped magnets. Namely, whereas the individual field poles on the moving member 37 of FIG. 8 are produced by the exciting currents passed through the field windings 2B1 to 2B7 received in the ring-shaped slots, the individual field poles are produced in the linear motor of FIG. 11 by providing the ring-shaped magnets 381 to 386 magnetized in the normal direction. FIG. 12 is a perspective view showing an external appearance of the moving member 310 employed in the linear motor of FIG. 11. The armature core 110 in this embodiment has three-phase windings, i.e., U-phase, V-phase and W-phase windings, provided thereon in a similar manner to the linear motor of FIG. 8.

Further, FIG. 13 is a diagram of a linear motor according to a fifth embodiment of the invention as viewed in the Y-axis direction, showing a sectional structure of the linear motor in the X- and Z-axis planes. The linear motor according to the fifth embodiment is generally similar in fundamental structure to the linear motor of FIG. 8 but different from the latter in that field poles are produced, on a non-magnetic truncated right-circular-cone body 120 of the moving member 121, by ring-shaped magnetic substance segments 12A to 12F and ring-shaped permanent magnets 123 to 129 provided along the periphery of the non-magnetic truncated right-circular-cone body 120. The ring-shaped magnetic substance segments 12A to 12F and ring-shaped permanent magnets 123 to 129 are provided on the moving member 121 in an alternating fashion as shown in FIG. 13, and each of the magnetic substance segments 12A to 12F and permanent magnets 123 to 129 has a non-magnetic inner circumference. The ring-shaped permanent magnets 123 to 129 are magnetized along the tapering or traveling direction Z of the moving member 121 and arranged so that the same poles (N and S poles) are opposed to each other. This way, N and S magnetic poles are produced on the outer surfaces of the ring-shaped magnetic substance segments 12A to 12F together forming tapered outer surface of the moving member 121. In the illustrated example of FIG. 13, N poles are produced on the surfaces of the magnetic substance segments 12A, 12C and 12E while S poles are produced on the surfaces of the magnetic substance segments 12B, 12D and 12F. The armature core 122 in this embodiment has three-phase windings, i.e., U-phase, V-phase and W-phase windings, provided thereon in a similar manner to the linear motor of FIG. 8.

Figure 14:
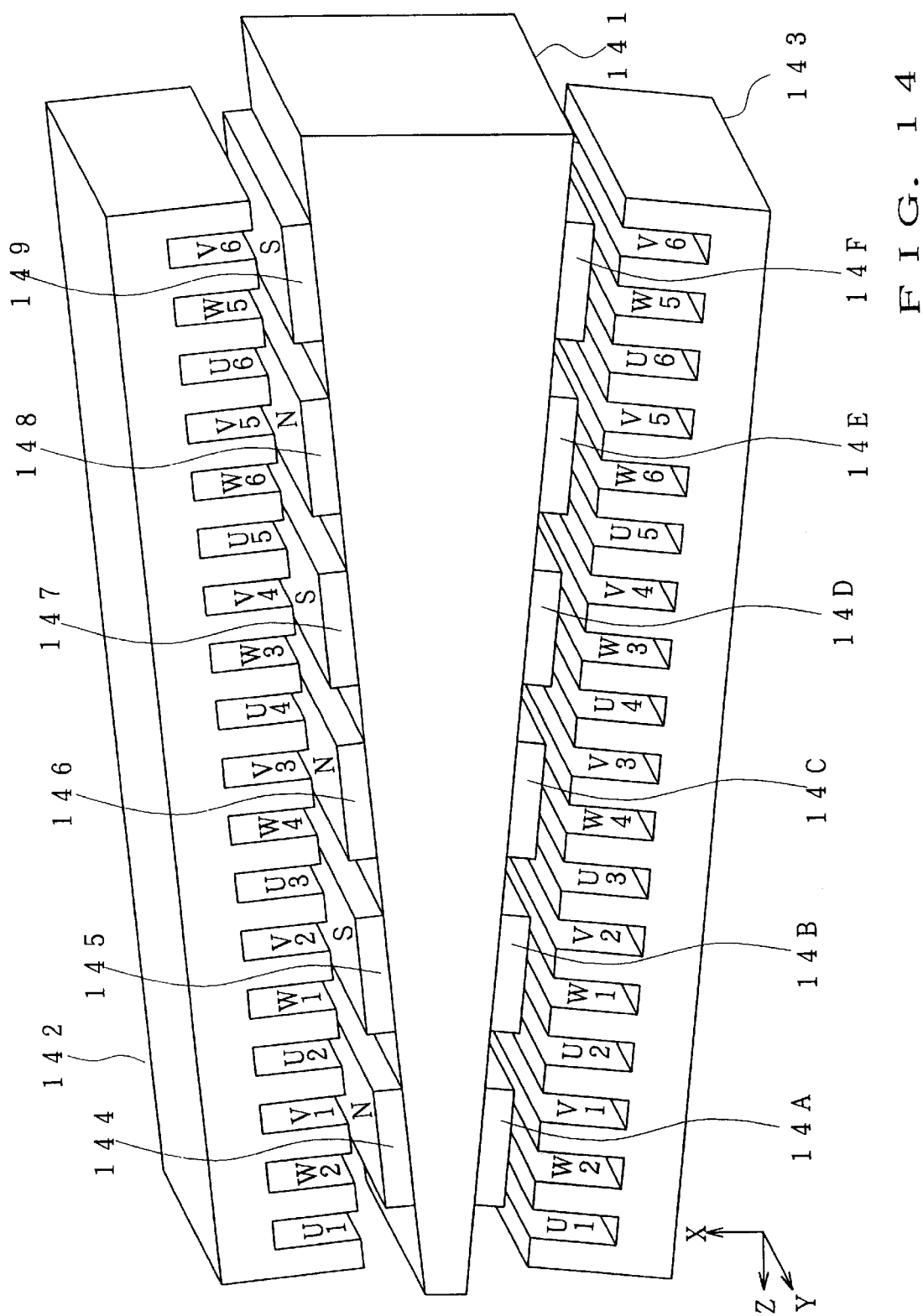
FIG. 14 is a perspective view showing a general construction of a linear motor in accordance with a sixth embodiment of the present invention.

Further, FIG. 14 is a perspective view showing a general construction of a linear motor in accordance with a sixth embodiment of the present invention. This linear motor is different from the linear motor of FIG. 1 in that permanent magnets 144 to 14F each in the form of a thin rectangular parallelepiped, which are systematically arranged on a wedge-shaped moving member 141, replace the magnetic field cores 2A and 2B of FIG. 1. FIG. 14 shows two armature cores 142 and 143 opposed to the upper and lower surfaces of the moving member 141; alternatively, permanent magnets may be provided to face the upper and lower and left and right surfaces of the moving member 141 and the armature cores may also be provided to face the these four surfaces of the moving member 141. Whereas the moving member 141 has a body in the shape of a truncated quadrangular pyramid having a square base and the moving member and armature cores have gradually increasing widths in the example of FIG. 15, the moving member 141 and armature cores 142 and 143 in the example of FIG. 14 have uniform widths. Note that the base shape (, i.e., sectional shape as viewed in a direction normal to the traveling direction) of the moving member 141 may be any other polygon than a square, such as a rectangle. Each of the armature cores in this embodiment has three-phase windings, i.e., U-phase, V-phase and W-phase windings, provided thereon in a similar manner to the armature core of FIG. 1.

Figure 15:
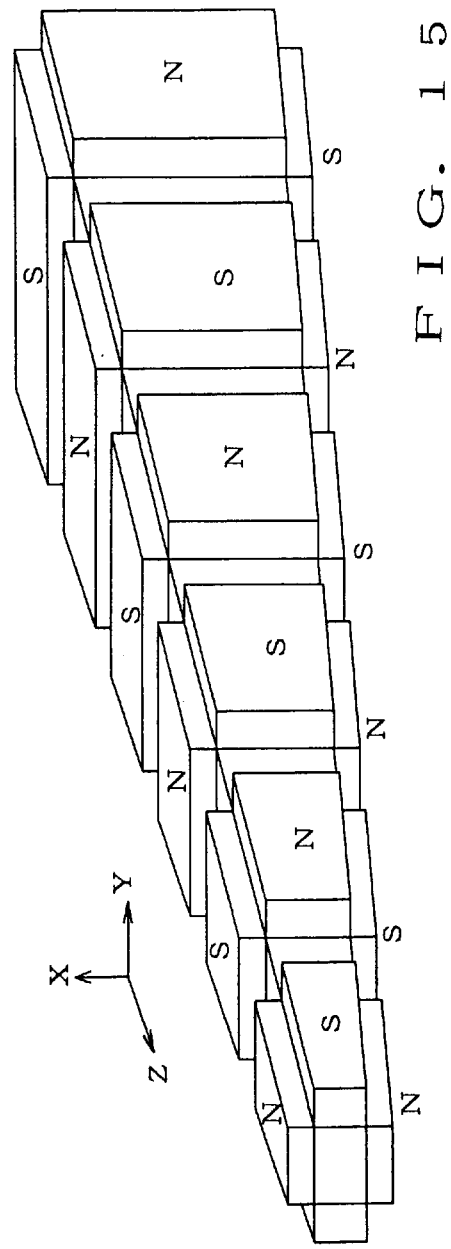
FIG. 15 is a perspective view showing a modification of permanent magnets of FIG. 14.
Figure 16:
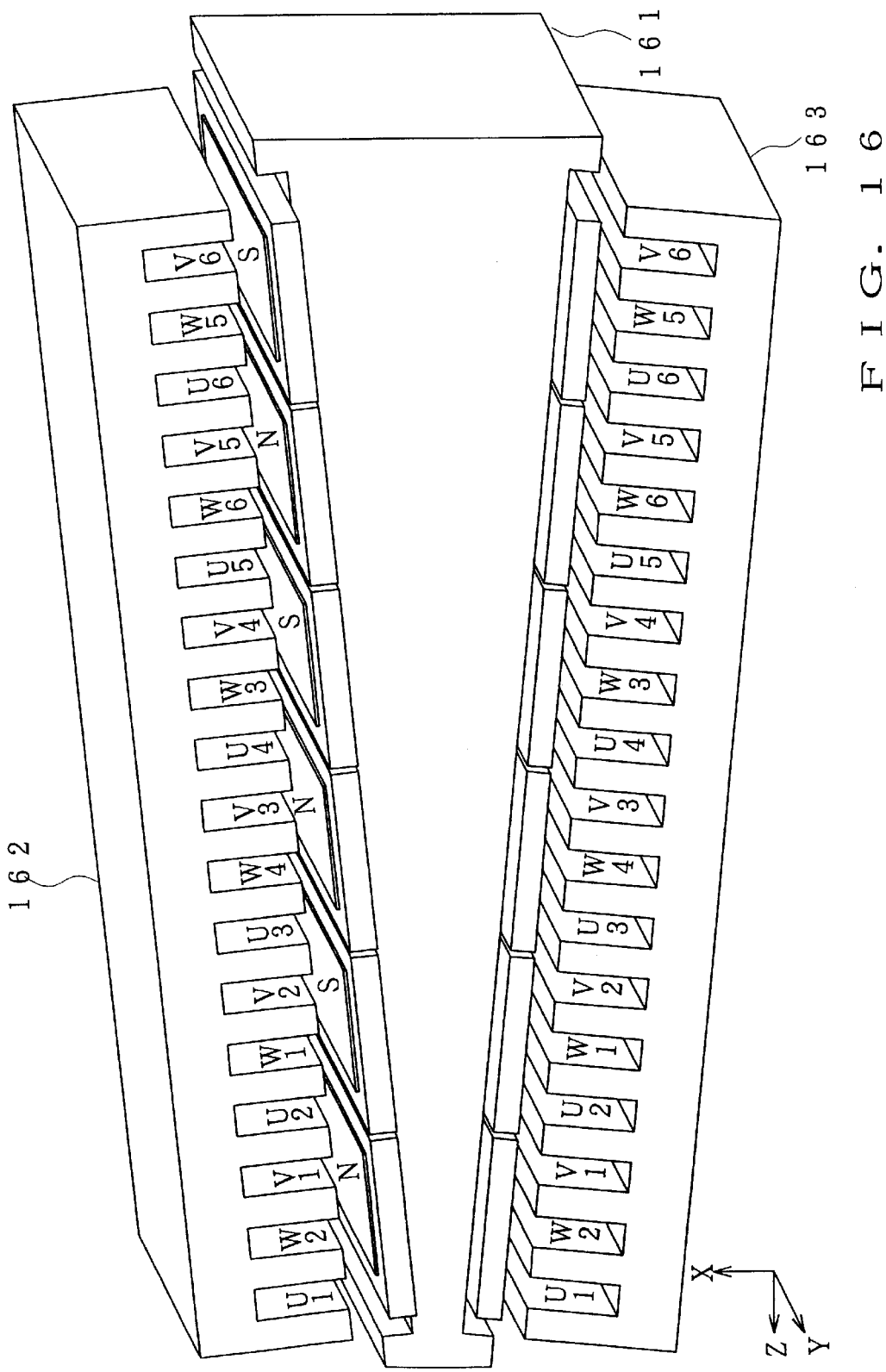
FIG. 16 is a perspective view showing a general construction of a linear motor in accordance with a seventh embodiment of the present invention.

FIG. 16 is a perspective view showing a general construction of a linear motor in accordance with a seventh embodiment of the present invention. This linear motor is different from the linear motor of FIG. 15 in that rectangular field windings replace the permanent magnets of the linear motor of FIG. 15 are received in slots formed in the upper and lower surfaces of the moving member 161 so as to produce field poles. FIG. 16 shows two armature cores 162 and 163 opposed to the upper and lower surfaces of the moving member 161; alternatively, the moving member 161 may be formed into a shape as shown in FIG. 15 so that the field windings are received in the individual slots. In such a case, the base shape of the moving member 161 may be any polygon such as a square or rectangle. Further, in stead of field poles being produced by the field windings as in the linear motor of FIG. 16, the field poles may be produced by providing permanent magnets, each in the shape of a rectangular parallelopiped, in slots of the moving member 161 as in the example of FIG. 13. Each of the armature cores in this embodiment has three-phase windings, i.e., U-phase, V-phase and W-phase windings, provided thereon in a similar manner to the armature core of FIG. 1.

Figure 17:
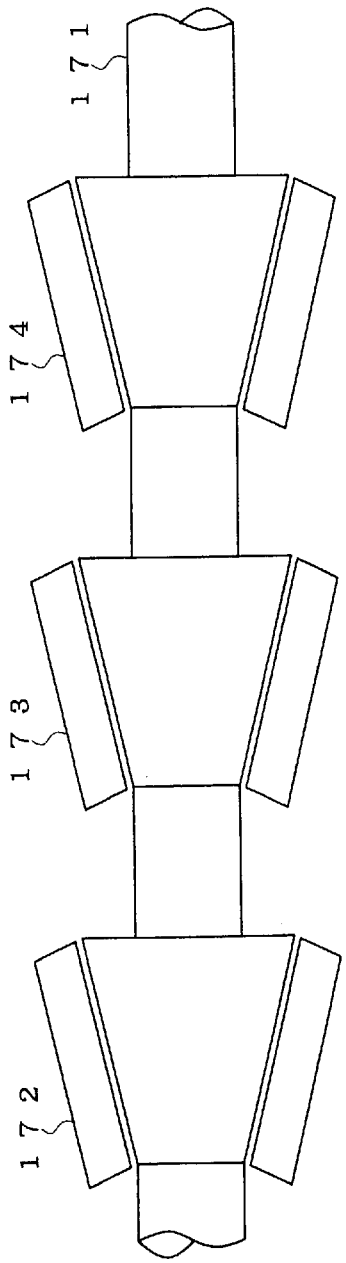
FIG. 17 is a diagram showing another embodiment of the present invention where a plurality of the inventive tapered linear motor structure are connected in series in the traveling direction.

FIG. 17 is a diagram showing another embodiment of the present invention where a plurality of the above-described linear motor structures are connected together in series along the traveling direction Z to thereby provide a so-called multi-stage linear motor. Specifically, the moving member 171 in the embodiment of FIG. 17 includes a plurality of tapered magnetic field poles provided thereon in spaced-apart relation to each other and a plurality of armature cores 172 to 174 each provided around the periphery of one of the field poles. It should be obvious that the magnetic field cores in the linear motors as shown in FIGS. 1 and 7 are provided around the periphery of the field poles. Thrust control for such a multi-stage linear motor is performed in generally the same manner as for the above-described single-stage linear motors. It should also be obvious that any number of the linear motor structures may be connected in series depending on thrust intensity required. In an alternative, a plurality of the linear motor structures may be connected together in parallel to provide the multi-stage linear motor that provides a single moving shaft with a combination of respective thrust of the individual linear motor structures. In another alternative, a plurality of such multi-stage linear motors, each having the series-connected linear motor structures, may be connected in parallel.

Figure 18:
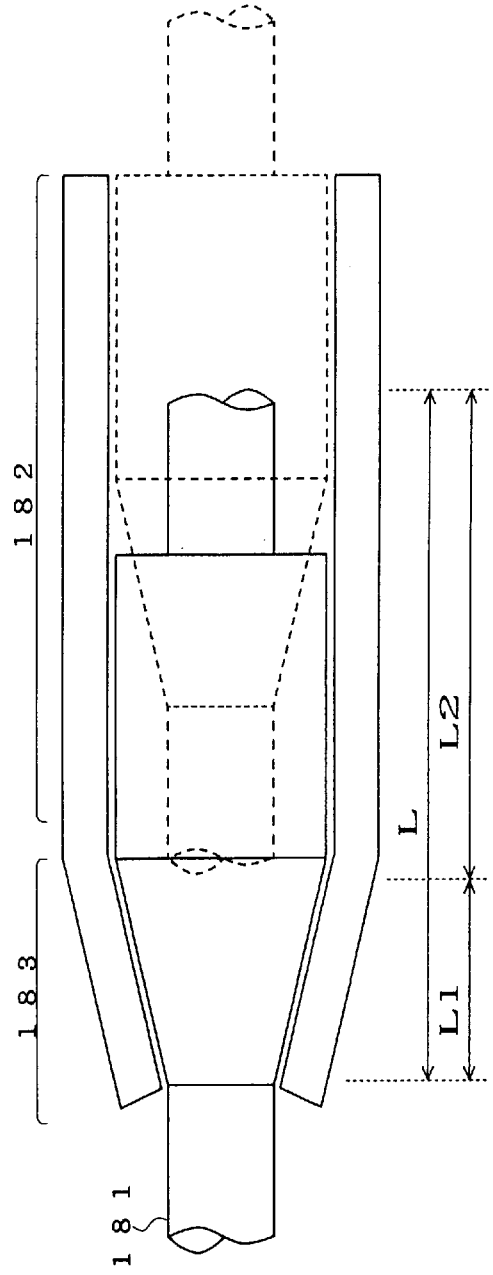
FIG. 18 is a diagram showing still another embodiment of the present invention which comprises a combination of the tapered linear motor structures and the conventional linear motor structures.

FIG. 18 is a diagram showing still another embodiment of the present invention which comprises a combination of the above-mentioned tapered linear motor structure and the conventional linear motor structure, to provide a composite linear motor. The above-described tapered linear motor structure can produce a great thrust only when the peripheral surface of the moving member's tapered portion is in proximity to the inner surface of the armature core and/or magnetic field core to form a narrow gap therewith. With the moving member 181 moved to a position as denoted by dotted line in FIG. 18, the tapered linear motor structure alone can no longer produce such a great thrust between the peripheral surface of the moving member's tapered portion and the inner surface of the armature and/or magnetic field core. However, combining the conventional linear motor structure 182 and the tapered linear motor structure 183 as shown in FIG. 18 guarantees a sufficient traveling distance and achieves a more sophisticated linear motor capable of producing a great thrust in the Z-axis direction. In this case, the tapered linear motor structure 183 can produce a great thrust only a limited or short section of the entire traveling distance of the moving member, but an advantageous or sophisticated linear motor can be provided which is capable of producing a larger thrust in a particular section than thrust produced during normal linear travel of the moving member.

In FIG. 18, the entire traveling range of the moving member is represented by L, and L1 represents a part of the traveling range L which can be controlled by the tapered linear motor structure 183 while L2 is another part of the traveling range L which can be controlled by the conventional linear motor structure 182. For the part L2, the linear travel drive can not be performed by the tapered linear motor structure 183, so that only the conventional linear motor structure 182 is used to control the linear travel drive. For the part L1, the linear travel drive can be performed by the tapered linear motor structure 183; the control may be performed by tapered linear motor structure 183 in conjunction with the conventional linear motor structure 182, which will lead to an increased thrust. In the linear motors comprised of a plurality of the linear motor structures as shown in FIGS. 17 to 20, energization of the individual linear motor structures may be controlled simultaneously through a common control. Namely, in the illustrated example, energization of the tapered linear motor structure 183 and conventional linear motor structure 182 may be controlled simultaneously. However, the present invention is of course not limited to such simultaneous energization, and the linear motor structures may be energized individually depending on a current position of the moving member 181.

Figure 19:
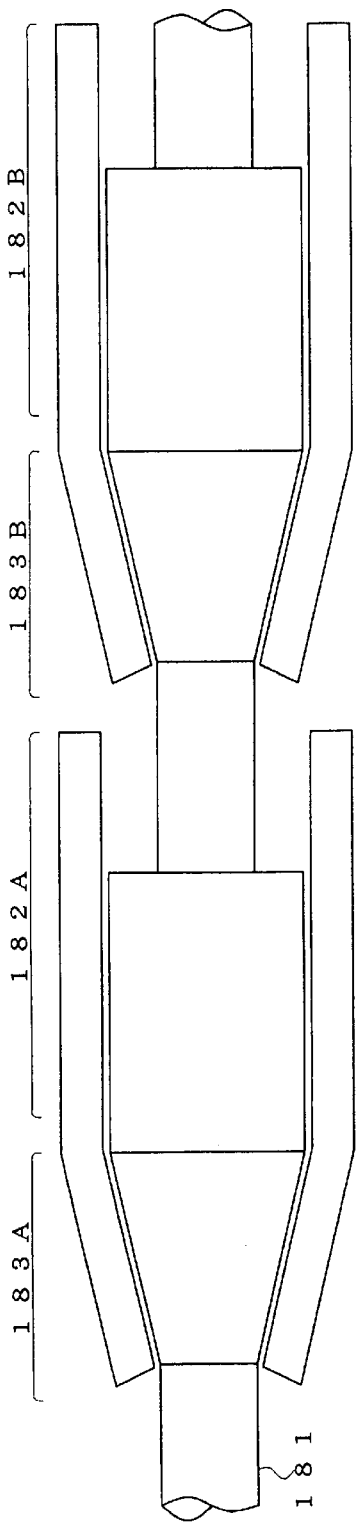
FIG. 19 is a diagram showing still another embodiment of the present invention which comprises a plurality of the composite linear motor structures of FIG. 18, as shown in FIG. 18, connected in series in the traveling direction

FIG. 19 is a diagram showing still another embodiment of the present invention which comprises a plurality of the linear motor structures, as shown in FIG. 18, connected in series with each other in the traveling direction of the moving member. The number of the linear motor structures thus connected in series may be three or more. Further, at least one of the linear motor structures in the multi-stage linear motor of FIG. 17 may be in the form of such a composite linear motor structure. In another alternative, any desired number of the composite linear motor structure and tapered linear motor structures may be connected in series and/or parallel, so as to provide a single moving shaft with a combination of respective thrust of the individual linear motor structures.

Figure 20:
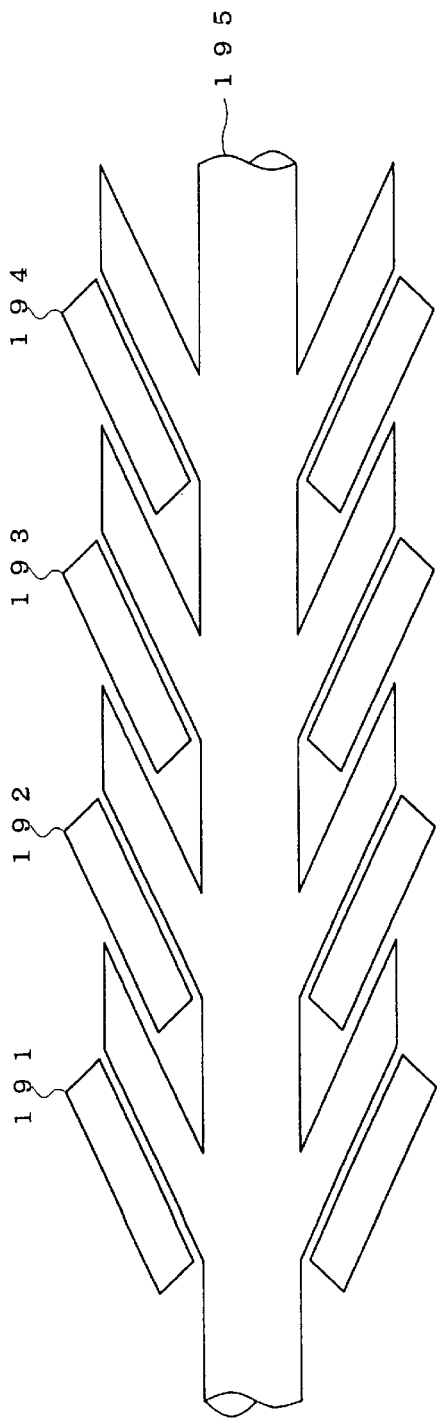
FIG. 20 is a diagram showing a modification of the embodiment show in FIG. 17.

FIG. 20 is a diagram showing a modification of the multi-stage linear motor embodiment of FIG. 17. Whereas the embodiment of FIG. 17 has been described as comprising several tapered linear motor structures connected in series with each other, the modification of FIG. 20 is characterized by the provision of as many tapered linear motor structures as possible connected in series along the traveling direction, so as to achieve a greater thrust. Specifically, in this modification, each of the armature cores 191 to 194 is constructed to be partly receivable in one of tapered or arrowhead- or wedge-shaped brim sections of the moving member 195. This modification can provide a multiplicity of the tapered linear motor structures along the traveling direction of the moving member. Thus connecting a multiplicity of the tapered linear motor structures will, however, reduce the travelable distance of the moving member.

Whereas the preferred embodiments and modifications have been described above in relation to the case where the moving member is in the shape of a truncated quadrangular pyramid, right circular cone, wedge or the like, the moving member may be of any other shape such as a column, cylinder or oval. In such a case, the inner surfaces of the magnetic field and armature cores opposed to the outer surface of the moving member have to be formed to appropriately correspond to the moving member's surface. If the linear moving member 3 is, for example, in the shape of a circular column, the inner surfaces of the magnetic field and armature cores opposed to the outer surface of the column-shaped moving member have to be curved to appropriately correspond to the moving member's peripheral surface.

The magnetic substance segments in the above-mentioned embodiments may be made of any of iron material (e.g., pure iron, soft iron, cast steel, magnetic steel band, or nondirectional or directional silicon steel), iron-nickel alloy (e.g., Permalloy, Isoperm or Perminvar), dust core (carbonyl dust core, Permalloy dust core or Sendust dust core), or ferrite (spinel ferrite, composite ferrite such as Mn—Zn ferrite, Cu—Zn ferrite, Ni—Zn ferrite or Cu—Zn—Mg ferrite).

Furthermore, the relationship between the numbers of magnetic poles and slots described above in relation to the preferred embodiments is just illustrative, and any desired combination of the numbers of magnetic poles and slots may of course be employed. Moreover, the preferred embodiments have been described in relation to the case where the field windings are single-layer lap windings, they may be dual-layer lap windings.

In summary, the present invention arranged in the above-described manner can produce a larger thrust in a particular section than thrust produced during normal linear travel, and can easily produce a particular degree of thrust that can not be produced by conventional linear motors.

What is claimed is:

1. A linear motor comprising:
   a first member tapered relative to a traveling direction thereof to provide a surface slanted relative to the traveling direction toward one end of said first member;
   a second member having a surface that is opposed to the slanted surface of said first member and slanted relative to the traveling direction at an angle corresponding to a slanted angle of the slanted surface of said first member;
   a field pole producing section that produces field poles on the slanted surface of one of said first member and second member; and
   an armature section provided on another of said first member and second member and including armature windings, said armature section producing electromagnetic poles corresponding to electric currents passed through said armature windings,
   wherein the one of said first member and second member moves relative to the other of said first member and second member in response to excitation of said armature windings.

2. A linear motor as recited in claim 1 wherein a first member includes magnetic and non-magnetic substance segments provided on the slanted surface thereof alternately along the traveling direction,
   said armature section is provided on said second member, and
   said field pole producing section includes a magnetic field core and field windings provided independently of said first member, said magnetic field core being fixed relative to said second member and having a surface opposed to the slanted surface of said first member and slanted relative to the traveling direction at an angle corresponding to the slanted angle of the slanted surface of said first member so that field poles corresponding to magnetic poles produced on said magnetic field core are produced on the magnetic substance segments of said first member in response to excitation of said field windings.

3. A linear motor as recited in claim 2 wherein said armature section produces a first linearly moving magnetic field, and said field pole producing section produces a second linearly moving magnetic field synchronizing with said first linearly moving magnetic field in a predetermined phase relationship.

4. A linear motor as recited in claim 1 wherein said field pole producing section includes field windings provided on said first member and produces field poles on the slanted surface of said first member by excitation of said field windings.

5. A linear motor as recited in claim 1 wherein said field pole producing section includes permanent magnets provided on said first member and produces field poles on the slanted surface of said first member by excitation of said permanent magnets.

6. A linear motor as recited in claim 1 wherein said first member is in the shape of a truncated right quadrangular pyramid having said surface slanted toward one end of said first member in the traveling direction.

7. A linear motor as recited in claim 1 wherein said first member is in the shape of a truncated light circular cone having said surface slanted toward one end of said first member in the traveling direction.

8. A linear motor including a plurality of linear motor structures connected together, at least one of the plurality of linear motor structures being an improved linear motor structure, said improved linear motor structure comprising:

a first member tapered relative to a traveling direction thereof to provide a surface slanted relative to the traveling direction toward one end of said first member;

a second member having a surface that is opposed to the slanted surface of said first member and slanted relative to the traveling direction at an angle corresponding to a slanted angle of the slanted surface of said first member;

a field pole producing section that produces field poles on the slanted surface of one of said first member and second member; and an armature section provided another of said first member and second member and including armature windings, said armature section producing electromagnetic poles corresponding to electric currents passed through said armature windings, wherein the one of said first member and second member moves relative to the other of said first member and second member in response to excitation of said armature windings.

9. A linear motor as recited in claim 8 wherein at least another of said linear motor structures is a conventional linear motor structure where opposed surfaces of said first member and second member are not slanted relative to the traveling direction.

* * * * *